US008323808B2

(12) United States Patent
Kitakami et al.

(10) Patent No.: US 8,323,808 B2
(45) Date of Patent: Dec. 4, 2012

(54) PERPENDICULAR MAGNETIC RECORDING MEDIUM

(75) Inventors: Osamu Kitakami, Sendai (JP); Yutaka Shimada, Sendai (JP); Satoshi Okamoto, Sendai (JP); Takehito Shimatsu, Natori (JP); Hajime Aoi, Sendai (JP); Hiroaki Muraoka, Sendai (JP); Yoshihisa Nakamura, Sendai (JP); Hiroyuki Uwazumi, Shinagawa-ku (JP); Tadaaki Oikawa, Yokosuka (JP)

(73) Assignees: Fuji Electric Co., Ltd. (JP); National University Corporation Tohoku University (JP)

( * ) Notice: Subject to any disclaimer, the term of this patent is extended or adjusted under 35 U.S.C. 154(b) by 1957 days.

(21) Appl. No.: 11/032,691

(22) Filed: Jan. 10, 2005

(65) Prior Publication Data

US 2005/0181237 A1     Aug. 18, 2005

(30) Foreign Application Priority Data

Jan. 9, 2004    (JP) .................................. 2004-003625

(51) Int. Cl.
*G11B 5/66*      (2006.01)
(52) U.S. Cl. .......................... 428/827; 428/800; 428/826
(58) Field of Classification Search .................. 428/836, 428/836.1, 836.2, 827
See application file for complete search history.

(56) References Cited

U.S. PATENT DOCUMENTS

| | | | | |
|---|---|---|---|---|
| 5,851,643 A | * | 12/1998 | Honda et al. | ............. 428/212 |
| 6,447,936 B1 | * | 9/2002 | Futamoto et al. | ............. 428/827 |
| 6,899,959 B2 | * | 5/2005 | Bertero et al. | ............. 428/611 |
| 7,060,375 B2 | * | 6/2006 | Lee et al. | ............. 428/829 |
| 2003/0180576 A1 | * | 9/2003 | Nakamura et al. | ..... 428/694 MM |
| 2004/0185306 A1 | * | 9/2004 | Coffey et al. | .......... 428/694 TM |
| 2004/0185307 A1 | * | 9/2004 | Oikawa et al. | .......... 428/694 TP |

FOREIGN PATENT DOCUMENTS

| | | |
|---|---|---|
| JP | 63-247914 A | 10/1988 |
| JP | 5-082653 B2 | 11/1993 |
| JP | 11-296833 A | 10/1999 |

(Continued)

OTHER PUBLICATIONS

Heng Gong et al. Highly oriented perpendicular Co-alloy media on Si (111) substrates, Journal of Applied Physics, vol. 85, Issue 8, pp. 4699-4701 (1999). (JAP Homepage).*

(Continued)

*Primary Examiner* — Mark Ruthkosky
*Assistant Examiner* — Gary Harris
(74) *Attorney, Agent, or Firm* — Rossi, Kimms & McDowell LLP

(57) ABSTRACT

There is provided a perpendicular magnetic recording medium according to which both the thermal stability of the magnetization is good and writing with a magnetic head is easy, and moreover the SNR is improved. In the case of a perpendicular magnetic recording medium comprising a non-magnetic substrate 1, and at least a nonmagnetic underlayer 2, a magnetic recording layer 3 and a protective layer 4 formed in this order on the nonmagnetic substrate 1, the magnetic recording layer 3 comprises a low $K_u$ region 31 layer having a perpendicular magnetic anisotropy constant ($K_u$ value) of not more than $1 \times 10^5$ erg/cm$^3$, and a high $K_u$ region 32 layer having a $K_u$ value of at least $1 \times 10^6$ erg/cm$^3$. Moreover, the magnetic recording layer 3 is made to have therein nonmagnetic grain boundaries that contain a nonmagnetic oxide and magnetically isolate crystal grains, which are made of a ferromagnetic metal, from one another.

7 Claims, 4 Drawing Sheets

FOREIGN PATENT DOCUMENTS

| | | |
|---|---|---|
| JP | 2000-76636 A | 3/2000 |
| JP | 2002-063714 A | 2/2002 |
| JP | 2003-091811 A | 3/2003 |
| JP | 2003-178412 A | 6/2003 |
| JP | 2003-187413 A | 7/2003 |
| JP | 2003-217107 A | 7/2003 |
| JP | 2003-263715 A | 9/2003 |
| JP | 2003-346315 A | 12/2003 |
| WO | 03100773 A | 12/2003 |

OTHER PUBLICATIONS

Notification of Reason for Refusal, dated Jun. 8, 2010, issued in corresponding Japanese Patent Application No. 2004-361089, which claims priority from Japanese Patent Application No. 2004-003625. English translation only is provided.

* cited by examiner

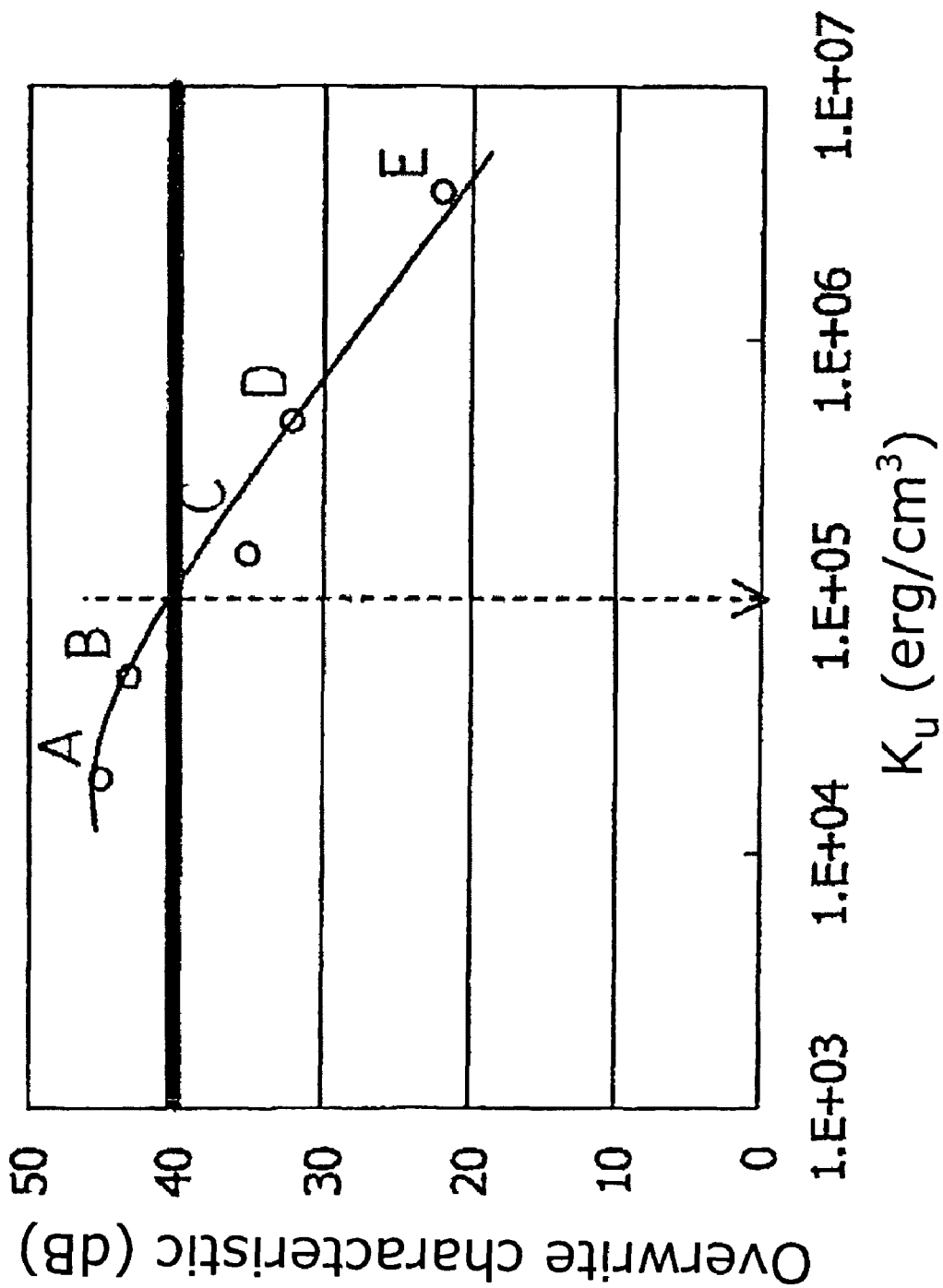

PERPENDICULAR MAGNETIC RECORDING MEDIUM

BACKGROUND OF THE INVENTION

1. Field of the Invention

The present invention relates to a magnetic recording medium, and in particular to a perpendicular magnetic recording medium for use in any of various magnetic recording devices such as an external storage device for a computer.

2. Description of the Related Art

To increase recording density in magnetic recording, the perpendicular magnetic recording method is attracting attention as an alternative to the conventional longitudinal magnetic recording method. This is because, compared with the conventional longitudinal magnetic recording method, the perpendicular magnetic recording method has advantages in that there is high thermal stability at a high recording density, and writing can be carried out sufficiently even with a recording medium having a high coercivity, and hence the recording density limit for the longitudinal magnetic recording method can be exceeded.

With a perpendicular magnetic recording medium, to record information with the direction of magnetization being perpendicular to the film plane of the magnetic recording layer, the magnetization must be stably maintained in the direction perpendicular to the film plane. The magnetic recording layer used in such a perpendicular magnetic recording medium is thus required to have a high perpendicular magnetic anisotropy constant ($K_u$ value). The $K_u$ value of the magnetic recording layer in perpendicular magnetic recording media currently being studied is approximately at least $1 \times 10^6$ erg/cm$^3$.

With magnetic grains having uniaxial magnetic anisotropy, the magnitude of magnetic field required to reverse the magnetization is called the anisotropy field $H_k$, and in general $H_k$ is expressed in terms of the saturation magnetization $M_s$ and the $K_u$ value as $H_k = 2K_u/M_s$. To bring about magnetization reversal, a magnetic field greater than $H_k$ is required, and this value is proportional to the $K_u$ value. With a magnetic recording medium, if $H_k$ is too high, then magnetization reversal upon writing using a magnetic head will thus being insufficient, and hence proper operation will no longer be possible; a suitably moderate $H_k$ value is thus required.

With a magnetic recording medium which is an aggregate of magnetic grains, the average magnetization reversal field, which is called the coercivity $H_c$, is determined by the distribution of the axes of easy magnetization and the $H_k$ values of the individual magnetic grains, and the strength of magnetic interactions between the magnetic grains and soon. In the case that magnetic interactions between the magnetic grains are small, the $H_c$ value approaches the $H_k$ value.

Moreover, the energy barrier E that must be surmounted to reverse the magnetization is given by $E = K_u V(1-H/H_k)^2$, where H is the magnetic field applied in the direction of the axis of easy magnetization, and V is the grain volume. If this energy barrier E is not sufficiently high relative to the thermal energy $k_B T$ ($k_B$ is Boltzman's constant, T is the absolute temperature), then the magnetization will reverse under the influence of thermal energy. This is called thermal fluctuation (or thermal disturbance) of the magnetization, and implies loss of information on the magnetic recording medium; the value of $K_u V$, which determines the energy barrier E, must thus be kept relatively high. Moreover, even if thermal fluctuation of the magnetization does not lead to loss of information, thermal fluctuation will surface as medium noise called reverse magnetic domain noise caused by partial reversal of recorded bits.

Note that $K_u V/k_B T$ is generally used as an indicator of thermal fluctuation, but this assumes that an external magnetic field is not being applied; an indicator of thermal fluctuation when a magnetic field H is being applied uses the energy barrier E described above, and is thus $K_u V(1-H/H_k)^2/k_B T$.

Furthermore, to reduce the medium noise and thus improve the quality of recorded information signals, i.e. to improve the signal-to-noise ratio (SNR), it is necessary to reduce the value of the activation grain size $D = V/\delta$ (here, $\delta$ is the thickness of the magnetic recording layer), i.e. make the units of magnetization reversal small. In the case that the units of magnetization reversal are small, minute recorded bits can be properly written, and hence the SNR is improved. Many studies have thus been carried out into reducing the value of D with perpendicular magnetic recording media. To reduce the value of D, it is effective to reduce the crystal grain diameter in the magnetic recording layer, and moreover reduce magnetic interactions between the crystal grains.

From the above, when the value of D is lowered to improve the SNR, the value of V drops, and hence a high $K_u$ value becomes necessary to maintain the value of the energy barrier E required to keep the magnetization stable. On the other hand, in the case that the $K_u$ value is kept high, the $H_k$ value increases, i.e. the magnetic field required to reverse the magnetization increases, and hence writing of information with a magnetic head becomes difficult. That is, with a magnetic recording medium, it is very difficult to satisfy all of 1) improving the SNR, 2) making the magnetization thermally stable (decreasing the reverse magnetic domain noise), and 3) making writing with a magnetic head easy, and there is a trade-off between these three factors.

As perpendicular magnetic recording media the aim of which is, out of the above three factors, to both improve the SNR and make the magnetization thermally stable, there have been proposed perpendicular magnetic recording media having so-called functionally separated type magnetic recording layers in which a plurality of magnetic recording layers having different $K_u$ values are formed on top of one another (see, for example Japanese Patent Application Laid-open No. 11-296833 and Japanese Patent Application Laid-open No. 2000-76636).

In Japanese Patent Application Laid-open No. 11-296833, it is disclosed that by forming on top of one another a layer of a region having a high $K_u$ value so that the thermal stability of the magnetization is high (upper layer) and a layer of a region having a somewhat low $K_u$ value so that magnetic interactions between the crystal grains are small and hence the SNR is high (lower layer), a medium having high thermal stability of the magnetization and a good SNR can be produced. Note that in an embodiment, it is disclosed that the $K_u$ value of the upper layer is made to be $2.5 \times 10^6$ to $5 \times 10^6$ erg/cm$^3$, and the $K_u$ value of the lower layer is made to be $1 \times 10^6$ to $2.5 \times 10^6$ erg/cm$^3$.

Moreover, in Japanese Patent Application Laid-open No. 2000-76636, a similar technical idea is disclosed, with it being disclosed that magnetic recording layers having different $K_u$ values and crystal orientations are formed on top of one another, whereby similar effects are obtained.

However, the matters disclosed in Japanese Patent Application Laid-open No. 11-296833 and Japanese Patent Application Laid-open No. 2000-76636 relate to simultaneously improving the SNR and making the magnetization thermally stable, but no consideration is given to the ease of writing with a magnetic head.

With increasing recording densities, there is an ever strengthening need to maintain a high $K_u$ value and reduce the D value so that small recorded bits can be stably maintained, and with such a medium, it is very important to secure ease of writing with a magnetic head.

SUMMARY OF THE INVENTION

In view of the above, it is an object of the present invention to provide a perpendicular magnetic recording medium according to which both the thermal stability of the magnetization is good and writing with a magnetic head is easy, and moreover the SNR is improved.

The above object is attained as follows. That is, according to an invention of claim 1, in the case of a perpendicular magnetic recording medium comprising a nonmagnetic substrate, a nonmagnetic underlayer, a magnetic recording layer and a protective layer formed in this order on the nonmagnetic substrate, the magnetic recording layer comprises a low $K_u$ layer having a perpendicular magnetic anisotropy constant $K_u$ of not more than $1 \times 10^5$ erg/cm$^3$, and a high $K_u$ layer having a perpendicular magnetic anisotropy constant $K_u$ of at least $1 \times 10^6$ erg/cm$^3$.

According to this constitution, both the thermal stability of the magnetization can be improved and writing with a magnetic head can be made easy. Following is an account of this effect. It is hypothesized that in the magnetic recording layer having the two-layer structure comprising the low $K_u$ layer and the high $K_u$ layer, magnetic coupling of the magnetization occurs in the thickness direction, and hence magnetization reversal occurs all at once. As an approximation, if the $K_u$ value of the low $K_u$ layer is ignored, then the $K_u$ value for the whole of the layered film structure decreases in accordance with the increase in the thickness, but the $M_s$ value of the low $K_u$ region is retained, and hence the $M_s$ value for the film structure as a whole does not change greatly, and thus as is clear from the previously mentioned formula $H_k=2K_u/M_s$, the $H_k$ value effectively decreases, and hence magnetization reversal becomes easy.

On the other hand, considering the energy barrier $E=K_u V (1-H/H_k)^2$, the value of V can be regarded as being the volume for the film structure as a whole, and hence the value of $K_u V$ for the layered film structure as a whole is greater than the value of $K_u V$ in the case of only a high $K_u$ region. Here, the $H_k$ value decreases as described above, and hence provided the externally applied magnetic field H is relatively low, the extent of the decrease in the energy barrier can be kept down. That is, it becomes easy to produce a medium according to which both the stability of the magnetization is good and writing with a magnetic head is easy. Note that a detailed quantitative description will be given later.

Moreover, as embodiments of the invention of claim 1 described above, the inventions of claims 2 to 7 described below are preferable. That is, preferably, in the case of the perpendicular magnetic recording medium according to claim 1 described above, the high $K_u$ layer comprises an alloy thin film having Co as a principal component thereof with at least Pt added thereto and having a hexagonal close-packed (hcp) crystal structure, and a preferred crystal orientation plane that is parallel to the film plane of the high $K_u$ layer is made to be the (002) plane (claim 2). Alternatively, in the case of the perpendicular magnetic recording medium according to claim 1 described above, the high $K_u$ layer comprises a layered film in which layers of a Co alloy and an alloy having Pt or Pd as a principal component thereof each having a thickness of not more than 2 nm are formed alternately, and a preferred crystal orientation plane that is parallel to the film plane of the high $K_u$ layer is made to be the (111) plane.

With the magnetic recording layer according to claim 2 or claim 3, by suitably adjusting the composition and layer structure thereof, a high $K_u$ value can be obtained, which is suitable for forming the high $K_u$ layer.

Furthermore, from the viewpoint of effectively reducing magnetic interactions between the crystal grains and thus improving the SNR, the invention of claim 4 described below is preferable. That is, preferably, in the case of the perpendicular magnetic recording medium according to any one of claims 1 through 3 described above, the high $K_u$ layer comprises crystal grains made of a ferromagnetic metal and nonmagnetic grain boundaries magnetically isolating the crystal grains from one another, and the nonmagnetic grain boundaries contain a nonmagnetic oxide as a principal component thereof (claim 4). Note that to improve the SNR, with a CoPt-based magnetic recording layer having an hcp structure as in the invention of claim 2, there is also a method in which a nonmagnetic metal such as Cr, Ta or B is added so as to promote formation of nonmagnetic grain boundaries.

Moreover, as embodiments relating to the low $K_u$ layer, the inventions of claims 5 and 6 described below are preferable. That is, preferably, in the case of the perpendicular magnetic recording medium according to any one of claims 1 through 4 described above, the low $K_u$ layer comprises a metal or alloy thin film having a face centered cubic (fcc) crystal structure, and a preferred crystal orientation plane that is parallel to the film plane of the low $K_u$ layer is made to be the (111) plane (claim 5). By orienting the (111) plane of the fcc structure so as to be parallel to the film plane, the crystal orientation when forming the high $K_u$ layer thereon can be suitably controlled.

Furthermore, preferably, in the case of the perpendicular magnetic recording medium according to any one of claims 1 through 5 described above, the low $K_u$ layer comprises crystal grains made of a ferromagnetic metal and nonmagnetic grain boundaries magnetically isolating the crystal grains from one another, and the nonmagnetic grain boundaries contain a nonmagnetic oxide as a principal component thereof (claim 6). This invention is preferable from the viewpoint of improving the SNR.

Furthermore, with the inventions described above, a plurality of magnetic recording layers having different $K_u$ values to one another are formed on top of one another so that magnetization reversal is made to occur all at once; however, in the case that the saturation magnetization $M_s$ values of the magnetic recording layers greatly differ from one another, magnetic field leakage will occur at the interface, and this will act as a demagnetizing field, resulting in magnetization reversal occurring more readily than necessary. From the viewpoint of preventing this, the invention of claim 7 described below is preferable. That is, preferably, in the case of the perpendicular magnetic recording medium according to any one of claims 1 through 6 described above, the ratio of the saturation magnetization $M_s$ of the low $K_u$ layer to the saturation magnetization $M_s$ of the high $K_u$ layer is in a range of 0.8 to 1.2 (claim 7).

EFFECTS OF THE INVENTION

According to the present invention, there can be provided a perpendicular magnetic recording medium according to which the thermal stability of the magnetization is improved, and the ease of writing with a magnetic head is improved, in particular the overwrite characteristic, described below, is improved, and moreover the SNR is improved.

'Overwriting' is writing a new signal over an originally recorded signal without erasing the originally recorded signal. With a magnetic recording device, when overwriting data, an error may arise if the original data is not replaced by new data. The overwrite characteristic generally represents the overwriting performance in terms of the degree of decay of the original signal after overwriting the original signal with a subsequent signal. Details will be given later.

BRIEF DESCRIPTION OF THE DRAWINGS

FIG. 4 is a graph showing the dependence of an overwrite characteristic value on the low $K_u$ region $K_u$ value, according to examples of the present invention.

DESCRIPTION OF THE PREFERRED EMBODIMENTS

Figure 1:
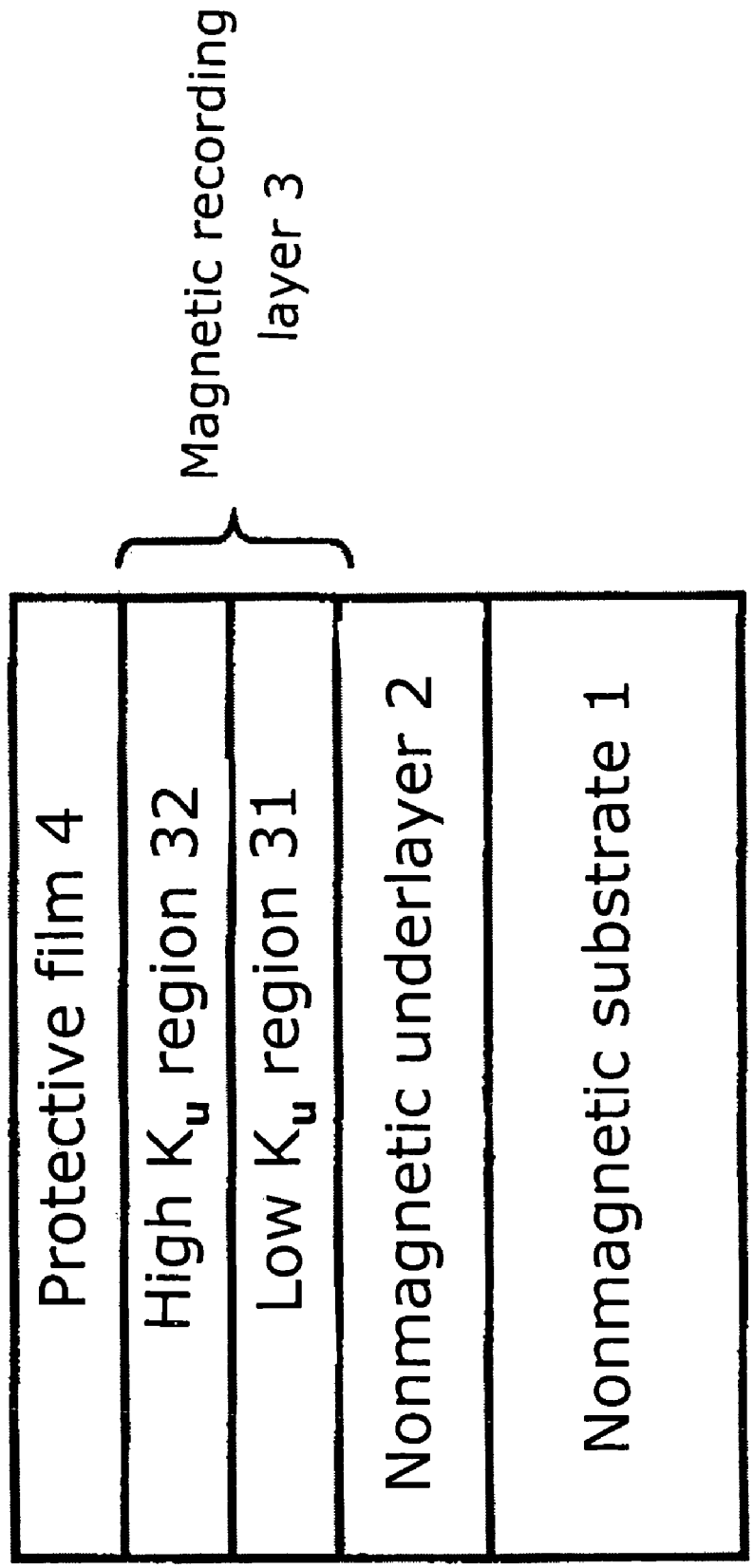
FIG. 1 is a schematic sectional view of a perpendicular magnetic recording medium according to an embodiment of the present invention.

Next, an embodiment of the present invention will be described with reference to FIG. 1. FIG. 1 is a schematic sectional view of a perpendicular magnetic recording medium according to an embodiment of the present invention.

The perpendicular magnetic recording medium of the present invention shown in FIG. 1 has a structure in which at least a nonmagnetic underlayer 2, a magnetic recording layer 3, and a protective film (protective layer) 4 are formed in this order on a nonmagnetic substrate 1. Note, however, that the effects of the present invention will still be obtained even if a seed layer or the like for controlling the crystal orientation and the crystal grain diameter of the nonmagnetic underlayer 2 is provided between the nonmagnetic underlayer 2 and the nonmagnetic substrate 1. Moreover, the effects of the present invention will also still be obtained even in the case that a relatively thick (thickness approximately several hundred nm) soft magnetic layer generally called a backing layer for improving the read-write sensitivity is provided between the nonmagnetic underlayer 2 and the nonmagnetic substrate 1. Furthermore, a liquid lubricant such as a perfluoropolyether may be applied onto the protective film 4.

As the nonmagnetic substrate 1, for example a crystallized glass, a chemically strengthened glass, or an Al alloy with plated NiP layer as used with ordinary magnetic recording media can be used.

The nonmagnetic underlayer 2 is used to suitably control the crystal grain diameter, the grain boundary segregation structure and the crystal orientation of the magnetic recording layer 3 formed thereon. There are no particular limitations on the material and thickness of the nonmagnetic underlayer 2. For example, a thin film of thickness approximately 3 to 30 nm made of a Co alloy containing at least approximately 30 at % of Cr, or a metal such as Ti, Ru, Pt, or an alloy containing Ti, Ru, Pt or the like can be used.

As the protective film 4, for example a thin film comprising mainly carbon can be used.

Next, a description will be given of the magnetic recording layer 3. As described earlier, the magnetic recording layer 3 comprises a low $K_u$ region 31 layer having a perpendicular magnetic anisotropy constant ($K_u$ value) of not more than $1\times10^5$ erg/cm$^3$, and a high $K_u$ region 32 layer having a $K_u$ value of at least $1\times10^6$ erg/cm$^3$. There are no particular limitations on the order of forming the low $K_u$ region 31 and the high $K_u$ region 32, but, for the purpose of efficiently applying a magnetic field produced by a magnetic head to the high $K_u$ region 32, it is preferable to form the low $K_u$ region 31 and the high $K_u$ region 32 on the nonmagnetic underlayer 2 in this order, as shown in FIG. 1.

There are no particular limitations on the thicknesses of the two regions, but it is not appropriate for the total thickness of the magnetic recording layer to exceed 30 nm, since then it will become difficult for magnetization reversal to occur all at once in the thickness direction. Furthermore, to apply the magnetic field produced by the magnetic head efficiently, the total thickness is preferably thinner at not more than 15 nm. By changing the ratio of the thicknesses of the low $K_u$ region 31 and the high $K_u$ region 32, the extent of the ease of magnetization reversal and the extent of the thermal stability of the magnetization can be controlled, and hence it is preferable to set this thickness ratio in accordance with the temperature and the magnetic head used.

To obtain a perpendicular magnetic recording medium with a layer structure as described above suitable for increased recording density, as the high $K_u$ region 32, as described earlier, it is preferable to use an alloy thin film having Co as a principal component thereof with at least Pt added thereto and having a hexagonal close-packed (hcp) crystal structure, and make the preferred crystal orientation plane that is parallel to the film plane be the (002) plane, or else use a layered film in which layers of a Co alloy and an alloy having Pt or Pd as a principal component thereof each having a thickness of not more than approximately 2 nm are formed alternately, and make the preferred crystal orientation plane that is parallel to the film plane be the (111) plane.

Moreover, to improve the SNR, with such a CoPt-based magnetic recording layer having an hcp structure, although there is also a method in which a nonmagnetic metal such as Cr, Ta or B is added so as to promote formation of nonmagnetic grain boundaries, forming nonmagnetic grain boundaries comprising mainly an oxide as described earlier is preferable for effectively reducing magnetic interactions between the crystal grains and thus improving the SNR. As the nonmagnetic oxide, for example publicly known SiO$_2$, or else Cr$_2$O$_3$, MgO, ZrO$_2$ or the like can be used.

Furthermore, as the low $K_u$ region 31, it is preferable to use a metal or alloy having a face centered cubic (fcc) crystal structure, and make the preferred crystal orientation plane that is parallel to the film plane be the (111) plane. By orienting the (111) plane of the fcc structure so as to be parallel to the film plane, the crystal orientation when forming the high $K_u$ region 32 thereon can be suitably controlled. There are no particular limitations on the material used for the low $K_u$ region 31, but for example a thin film of an NiFe alloy containing 40 to 90 at % of Ni, or such an NiFe alloy having up to 10 at % of Nb, Mo, Cu or the like added thereto is suitable.

Here, for the low $K_u$ region 31, reducing interactions between the crystal grains is again necessary for improving the SNR, and hence it is preferably to form nonmagnetic grain boundaries comprising mainly an oxide.

Furthermore, in the present invention, a plurality of magnetic recording layer regions having different $K_u$ values to one another are formed on top of one another so that magnetization reversal is made to occur all at once; however, in the case that the saturation magnetization $M_s$ values of the magnetic recording layer regions greatly differ from one another, magnetic flux leakage will occur at the interface, and hence to prevent this, it is preferable to make the ratio between the $M_s$ values of the magnetic recording layer regions be within a range of 0.8 to 1.2.

EXAMPLES

Next, examples of the present invention will be described with reference to FIGS. 2 to 4.

Example 1

Using a 2.5 inch disk-shaped chemically strengthened glass substrate as a nonmagnetic substrate, this substrate was washed, and was then put into a sputtering apparatus, and a nonmagnetic underlayer made of Ru of thickness 20 nm was formed using DC magnetron sputtering under an Ar gas pressure of 2.66 Pa (20 mTorr). Next, the Ar gas pressure was set to 0.67 Pa (5 mTorr), and using a target of 90 mol % (78Ni-18Fe-4Mo) and 10 mol % $SiO_2$ (the figures in the brackets are at %, likewise hereinafter), a low $K_u$ region was formed using RF magnetron sputtering. The thickness thereof was varied within a range of 0 to 10 nm.

Next, under an Ar gas pressure of 0.67 Pa (5 mTorr), using a target of 90 mol % (85Co-15Pt) and 10 mol % $SiO_2$, a high $K_u$ region was formed using RF magnetron sputtering. The thickness thereof was varied within a range of 5 to 20 nm. Next, a 10 nm-thick carbon protective layer was formed using DC magnetron sputtering, and then the substrate was removed from the vacuum, where by a magnetic recording medium having a constitution as shown in FIG. 1 was produced.

Note that for an Ni FeMo—$SiO_2$ single-layer film and a CoPt—$SiO_2$ single-layer film each of thickness 10 nm formed on the nonmagnetic underlayer as described above, the $K_u$ values determined using a magnetic torque meter and correcting for the demagnetizing field energy were $2 \times 10^4$ erg/cm$^3$ and $4 \times 10^6$ erg/cm$^3$ respectively.

Figure 2:
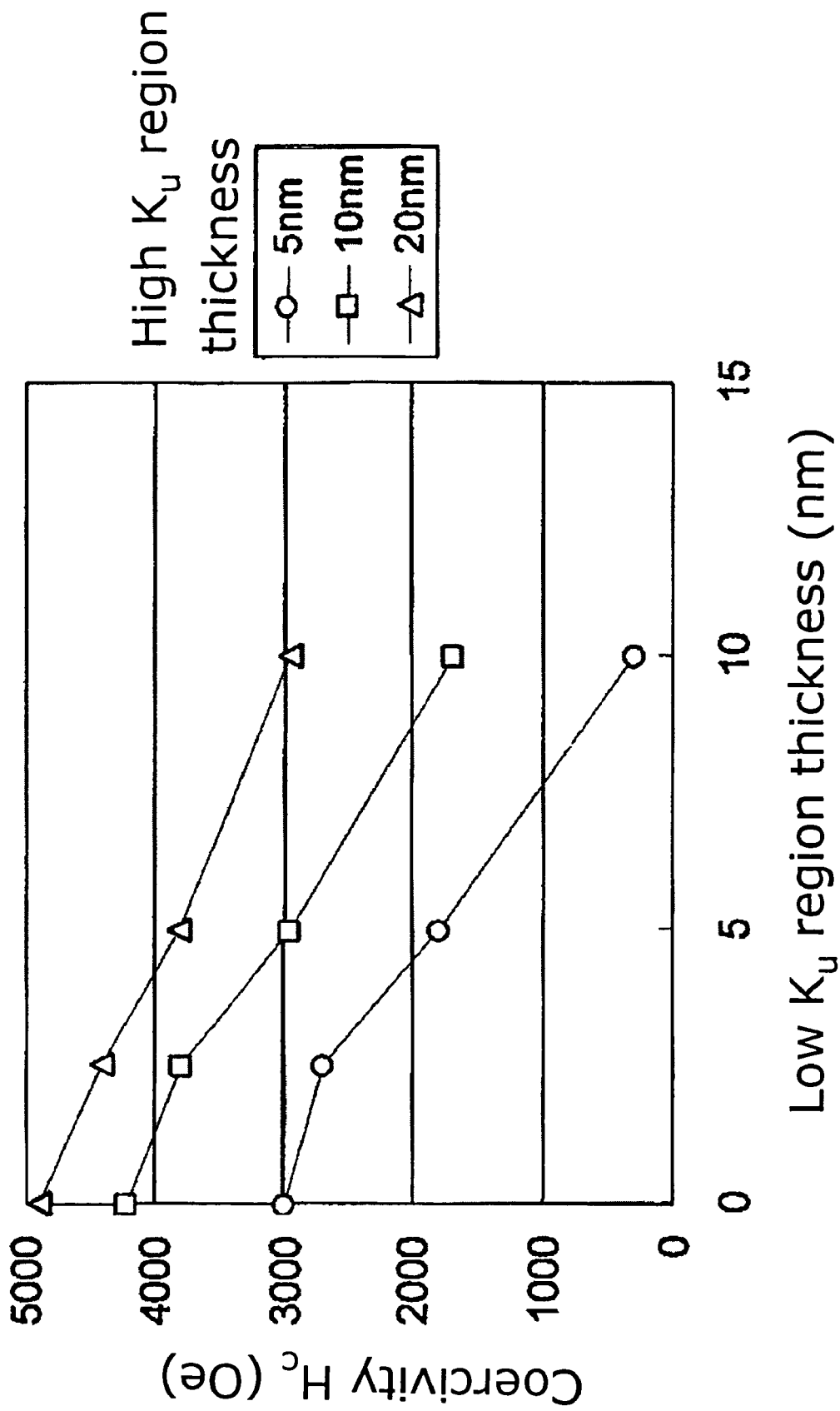
FIG. 2 is a graph showing changes with the low $K_u$ region thickness in the coercivity $H_c$ value, according to examples of the present invention.

FIG. 2 is a graph showing the changes with the thickness of the low $K_u$ region in the coercivity H, value measured using a vibrating sample magnetometer while applying a magnetic field in the direction perpendicular to the film plane for each of the perpendicular magnetic recording media produced. Moreover, FIG. 3 is a graph showing the changes with the thickness of the low $K_u$ region in the decay rate of the remanent magnetization $M_r$ with the logarithm of time in a state in which the magnetic field has been set to zero after magnetically saturating by applying a magnetic field of 20 kOe in the direction perpendicular to the film plane for each of the perpendicular magnetic recording media produced. Note that the time period over which measurement was continued was 30 minutes. Moreover, in FIGS. 2 and 3, the data is plotted for three high $K_u$ region thicknesses, that is 5 nm, 10 nm and 20 nm.

As is clear from FIG. 2, the value of the coercivity $H_c$ decreases as the thickness of the low $K_u$ region (nm) increases. This shows that upon increasing the proportion of the magnetic recording layer taken up by the low $K_u$ region, $H_c$ of the magnetic recording layer as a whole decreases, and hence writing with a magnetic head becomes easier.

Figure 3:
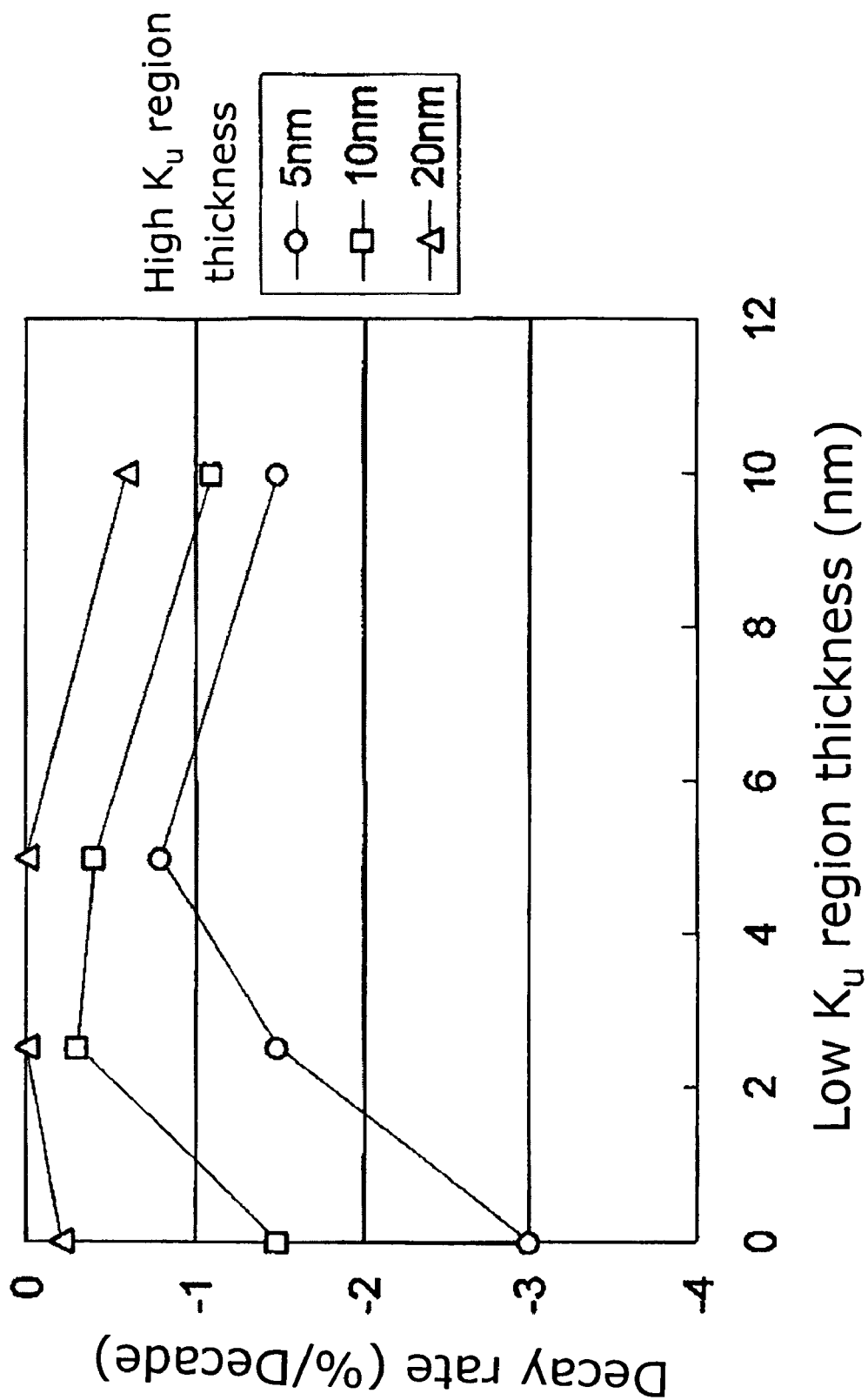
FIG. 3 is a graph showing changes with the low $K_u$ region thickness in the decay rate of the remanent magnetization $M_r$ with the logarithm of time, according to examples of the present invention.

On the other hand, as is clear from FIG. 3, the decay rate of the remanent magnetization (%/decade) generally first decreases as the thickness of the low $K_u$ region increases from 0 to approximately 5 nm, although this does depend on the thickness of the high $K_u$ region. This is because $K_uV$ for the film as a whole increases in accordance with the increase in the thickness of the low $K_u$ layer, and this corresponds to the thermal stability increasing. If the thickness of the low $K_u$ region is further increased, then the contribution of the low $K_u$ region increases, and hence the decay rate again increases, but combining with the results of FIG. 2, it can be seen that by suitably controlling the thicknesses of the low $K_u$ region and the high $K_u$ region, a medium for which $H_c$ is low and hence writing with a magnetic head is easy, and moreover the thermal stability of the magnetization is high with the decay rate of the magnetization being low can be produced. This is further verified in Example 2 below.

Note that detailed description will be omitted, but because nonmagnetic grain boundaries comprising mainly $SiO_2$ were formed, a good SNR is obtained for the magnetic recording layer in the present example.

Example 2

The present example relates to verifying the overwrite characteristic for magnetic recording media of the present invention.

Magnetic recording media having a constitution as shown in FIG. 1 were produced as in Example 1, except that the thickness of the low $K_u$ region was fixed at 2.5 nm and the thickness of the high $K_u$ region was fixed at 10 nm, and the composition of the target used when forming the low $K_u$ region was made to be any of five types (A to E) as shown in Table 1 below. Furthermore, after each medium had been removed from the vacuum, 2 nm of a liquid lubricant comprising a perfluoropolyether was applied thereon by spin coating. Note that in Table 1, the $K_u$ value determined using a magnetic torque meter and correcting for the demagnetizing field energy for a 10 nm-thick low $K_u$ region single-layer film formed on the nonmagnetic underlayer as described in Example 1 is also shown.

TABLE 1

| Target used | $K_u$ (erg/cm$^3$) |
|---|---|
| A: 90 mol % (78Ni—18Fe—4Mo) - 10 mol % $SiO_2$ | $2 \times 10^4$ |
| B: 90 mol % (60Ni—40Fe) - 10 mol % $SiO_2$ | $5 \times 10^4$ |
| C: 90 mol % (78Co—22Cr) - 10 mol % $SiO_2$ | $1.5 \times 10^5$ |
| D: 90 mol % (75Co—20Cr—5Pt) - 10 mol % $SiO_2$ | $5 \times 10^5$ |
| E: 90 mol % (85Co—15Pt) - 10 mol % $SiO_2$ | $4 \times 10^6$ |

FIG. 4 shows the dependence of the overwrite characteristic value for the magnetic recording media produced (the five media A to E in Table 1) on the $K_u$ value of the low $K_u$ region. For the overwrite characteristic, a 300 kFCI signal was initially written using a spin stand tester and a perpendicular magnetic recording single pole type head (written track width 0.25 μm), a 40 kFCI signal was then written thereover, and then the overwrite characteristic was determined as the ratio (in dB) between the 40 kFCI signal component and the remaining 300 kFCI signal component out of the frequency components of the playback signal as measured using a spectrum analyzer. The larger the value of the overwrite characteristic, the less the original signal remains.

Note that 'FCI' above is an abbreviation for 'flux changes per inch' and is an amount showing the number of magnetic flux changes per inch, i.e. the recording density of written bits in the track direction. For example, the above '300 kFCI' indicates that 300×1000=300,000 bits were written per inch. Moreover, '1.E+05' on the horizontal axis in FIG. 4 means '$1 \times 10^5$'.

It can be seen from Table 4 that, in the case that the $K_u$ value of the low $K_u$ region is less than $1 \times 10^5$ erg/cm$^3$, the overwrite characteristic reaches 40 dB, which is level at which there is no problem for practical use, whereas if the $K_u$ value is greater than this, then the overwrite characteristic deteriorates, meaning that there will be problems in terms of writing characteristics. Note that with all of the media, the decay rate of the remanent magnetization $M_r$ with the logarithm of time in a state in which the magnetic field has been set to zero after magnetically saturating by applying a magnetic field of 20 kOe in the direction perpendicular to the film plane of the medium was less than 1%.

What is claimed is:

1. A perpendicular magnetic recording medium, comprising a nonmagnetic substrate, a nonmagnetic underlayer, a magnetic recording layer and a protective layer formed in this order on said nonmagnetic substrate, wherein said magnetic recording layer comprises a low $K_u$ layer having a perpendicular magnetic anisotropy constant $K_u$ of not more than $1 \times 10^5$ erg/cm$^3$, and a high $K_u$ layer having a perpendicular magnetic anisotropy constant $K_u$ of at least $1 \times 10^6$ erg/cm$^3$.

2. The perpendicular magnetic recording medium according to claim 1, wherein said high $K_u$ layer comprises an alloy thin film having Co as a principal component thereof with at least Pt added thereto and having a hexagonal close-packed crystal structure, and a preferred crystal orientation plane that is parallel to the film plane of said high $K_u$ layer is made to be the (002) plane.

3. The perpendicular magnetic recording medium according to claim 1, wherein said high $K_u$ layer comprises a layered film in which layers of a Co alloy and an alloy having Pt or Pd as a principal component thereof each having a thickness of not more than 2 nm are formed alternately, and a preferred crystal orientation plane that is parallel to the film plane of said high $K_u$ layer is made to be the (111) plane.

4. The perpendicular magnetic recording medium according to claim 1, wherein said high $K_u$ layer comprises crystal grains made of a ferromagnetic metal and nonmagnetic grain boundaries magnetically isolating said crystal grains from one another, and said nonmagnetic grain boundaries contain a nonmagnetic oxide as a principal component thereof.

5. The perpendicular magnetic recording medium according to claim 1, wherein said low $K_u$ layer comprises a metal or alloy thin film having a face centered cubic crystal structure, and a preferred crystal orientation plane that is parallel to the film plane of said low $K_u$ layer is made to be the (111) plane.

6. The perpendicular magnetic recording medium according to claim 1, wherein said low $K_u$ layer comprises crystal grains made of a ferromagnetic metal and nonmagnetic grain boundaries magnetically isolating said crystal grains from one another, and said nonmagnetic grain boundaries contain a nonmagnetic oxide as a principal component thereof.

7. The perpendicular magnetic recording medium according to claim 1, wherein the ratio of the saturation magnetization $M_s$ of said low $K_u$ layer to the saturation magnetization $M_s$ of said high $K_u$ layer is in a range of 0.8 to 1.2.

* * * * *